United States Patent Office 2,819,641
Patented Jan. 14, 1958

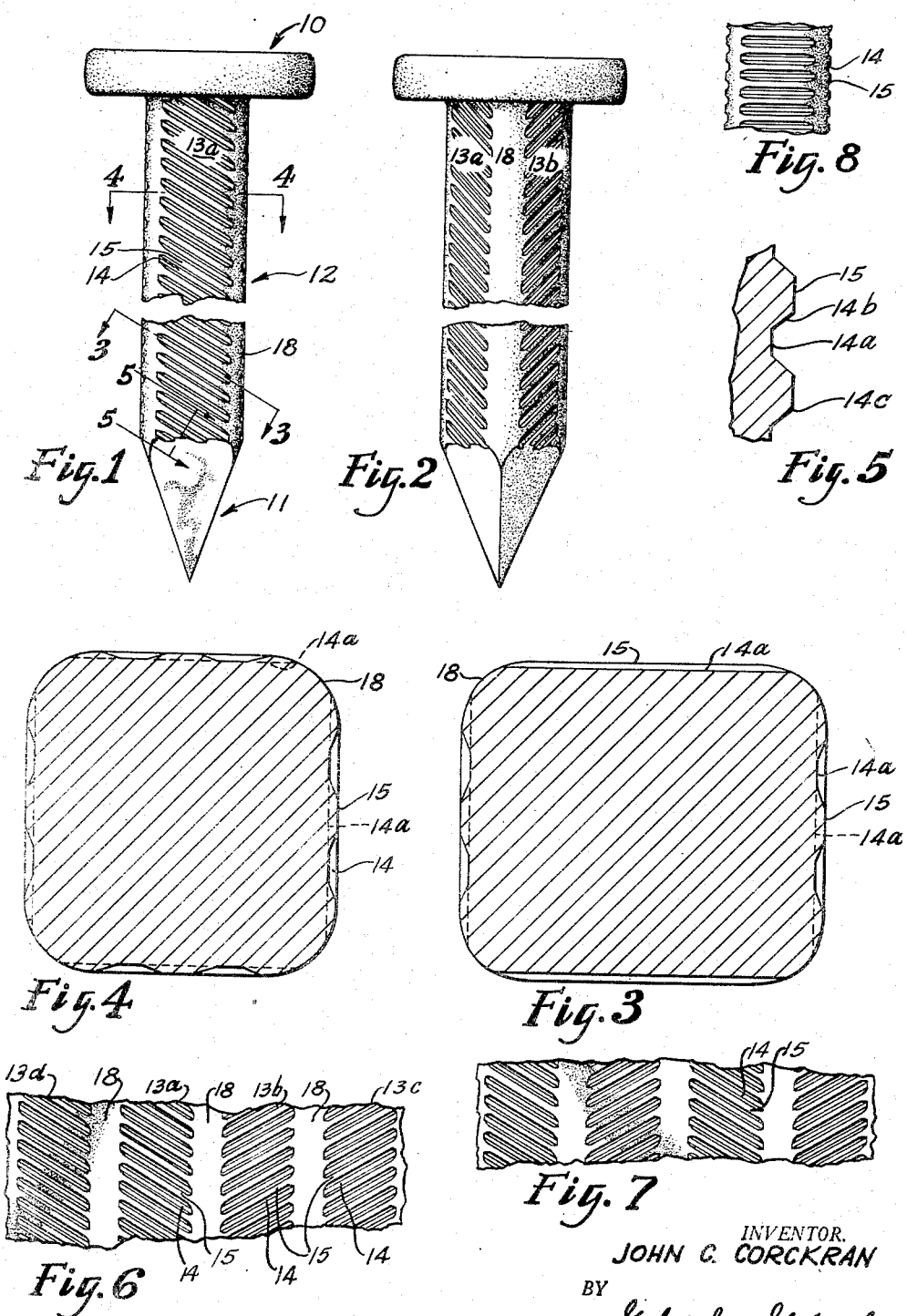

2,819,641

WIRE NAIL WITH INDENTED SHANK SIDES TO INCREASE HOLDING POWER

John C. Corckran, Baltimore, Md.

Application March 22, 1955, Serial No. 495,868

5 Claims. (Cl. 85—21)

The present invention relates to a penetrating fastener adapted to be hammer driven, such as a nail or spike and more particularly to a square wire nail or spike of increased holding power and strength and of improved driving characteristics. However, in this application the invention will be described generally in terms of nail structure.

For that class of hammer driven fasteners embracing what are commonly called nails and spikes and the like, physical forms of great diversity have been developed and used. Of course different section areas and lengths of shank have been used for differences in loading or penetration conditions encountered in various applications; different head sizes and shapes, for particular desired finished appearance, for ease in setting or removing the fastener, or for providing a desired degree of head purchase or bearing area as required by the material on which the head is to bear; and different overall forms dictated by machinery or materials which it has been desired to use for production of the fastener.

Apart from such differences, various other forms of nails and spikes have been used with specific functional characteristics for particular applications. Thus ordinary sharp pointed round nails tend to split or run out of wood, especially when used near an end or edge. To minimize such tendencies cut nails are still used, or blunt points wire nails, because in having flat rather than pointed penetrating ends they cut wood fibers along the penetration path rather than merely displacing and wedging them sideways and further do not follow the grain of the wood. To provide holding power, that is, resistance against "pull-out," in some nails the shank portion has been modified to furnish some degree of mechanical interlock as well as frictional holding between the nail and penetrated material. To this end, in heavy rail spikes along the length of the shank a series of spaced, more or less transversely extending grooves and ridges or "barbs" have been formed by special hot working or forging or cutting operations to engage the wood and thereby hinder pull-out or withdrawal. Likewise in round wire nails the cylindrical shank has been modified by raising barbs thereon, by forming coarse threads or annular corrugations spaced along its length, or otherwise interrupting the surface to provide relatively elevated and depressed formations whereby some mechanical interlocking of the nail and penetrated material is attained. For a similar purpose nails are made of nonround wire stock with the shank portion twisted to result in helical ridges along the length of the nails. A yet different expedient for increasing holding power is seen in the application of a special shank coating such as rosin or cement.

In such fasteners the modifications of the simple common shank structure intended to increase holding power have entailed disadvantages either in the material or machinery required for manufacture usually involving added cost, or in characteristics of the fastener itself. Threaded or corrugated nails require a separate process step, therefore threading or corrugating machines with auxiliary handling equipment beyond that of the ordinary nail machine; and so also the twisted type nail, which further is produced from special wire stock. Coated fasteners of course require not only further processing but also additional materials.

Functionally untoward features appear in a nail with peripheral or annular grooves and ridges on the shank, or extended barb structures obtained by forming deep indentations or cuts across the shank surface. The reduced shank cross sections allows the nail to bend more readily, or even break during driving; and for like reason clinching may be unreliable or impractical because of breakage.

The preferred form of the nail structure, which is the subject of the present invention, has a shank of approximately square cross section, with convexly curved corners however; and along each side of the shank a series of relatively closely spaced similar linear grooves are indented or impressed across the shank resulting in a corresponding series of alternating ridges or lands. These grooves are of such depth relative to the extent of the corner curvature that were those planes extended, wherein the bottom-most portions of the grooves of adjacent shank sides generally lie, the line of intersection would fall outside the corresponding longitudinal shank edge. Opposite sides of the shank are parallel. As a result four continuous longitudinal lands are formed in respective shank corners or edges, even though the groove bottoms end in marginal portions of the curved edges of the shank. Where the common wire nail pyramidal point is used, it is preferred that the slant edges of the point terminate at such longitudinal lands.

In the preferred form of shank structure, the aforementioned grooves are directed obliquely to the lengthwise direction of the shank, at an angle of from about forty-five to about sixty degrees. In any event the ends of the cross-wise lands are rounded into the shank edge or corner curvature. Considering the configuration of the alternating lands and grooves transverse to their width, the tops of lands and bottoms of the correlative grooves are substantially flat and of roughly the same width, with the groove walls or land sides slanted; that is, each oblique to the corresponding shank face or side, giving a toothed form with angle included between the land sides of from about forty-five to about sixty degrees, and a groove opening of considerably greater width than the flat of the land. Therefore a more or less sharp edge between each side and top flat of a land results, and the groove openings cumulatively occupy a greater part of the shank length than the land flats. The depth and width of the grooves in nails for general use are advantageously those produced by a standard straight knurl with a pitch on the order of thirty-two per inch, measured longitudinally of the nail in the case of lands directed obliquely as previously described.

These structural features minimize in marked degree certain of the above noted disadvantages of prior nails and import certain further advantages. Despite the presence of the sharp point of common wire nails from which arises the noted wood splitting tendency, a nail or spike including the structure of this invention may be driven much closer than ordinary wire nails to the edge of wood without running out by following the grain or without any splitting even in material such as redwood. This is believed to be a consequence of the form in the cross lands on each side of the square nail, with the described sharp edges—at least near the point—cutting some of the wood fibers along the penetration path rather than merely displacing or wedging them aside, Also the portion of each convex longitudinal land first penetrating the wood, although not cutting fibers as the cross lands do, apparently produces a complementary guide path in the wood for the succeeding portion to aid in preventing run-out.

The serrations or "barbs" constituted by the groove and land structure on the shank of the present nail generally confer a holding power far greater than that attained with an equal depth of penetration by a round wire nail of corresponding gage; and considering the material saving in this square nail, on a poundage basis these nails may have a eighty percent greater holding power. Hence a headless nail with the shank structure here disclosed is a fastener of great holding power.

On a weight basis, these nails have a holding power equal to that of corresponding annularly grooved or corrugated nails. In contrast, however, with prior corrugated threaded or grooved nails comparable holding power is achieved with interruptions of the surface which penetrate the shank in much lesser degree, so that the shank strength here permits clinching without the frequency of breakage, and driving without the bending or breakage frequency, attendant upon those prior structures. Furthermore the continuous edge or longitudinal lands confer added strength to the shank; and so also the preferred obliquity of the lands and grooves of the shank faces, since in any cross section perpendicular to the length only a fraction of the section is removed in comparison with grooves at right angles to the length. In similar fashion the tendency to fail under conditions of protracted vibration is decreased in comparison with prior serrated nails.

During penetration the wood fibers, initially deflected inwardly along the nail path, are not cut broach-wise along planes corresponding to the outermost sides of the nail lands, but rather at places which in the undeflected fibers would lie slightly inward of the square outline of the nail section, so that cut fiber ends spring or expand into the grooves for mechanical interlock, becoming particularly effective as a withdrawing force is applied.

The multiplicity of grooves and slant sides present— for a greater part of the flat side area of the shank than the residual land flats—openings for reception of cut fiber ends as well as uninterrupted fibers wedged therein. This provides not only holding power, but also minimizes the splitting tendency because of the decreased massive lateral displacement of the wood substance. In addition to the frictional forces of wood compressed by the longitudinal lands and top flats of the serration lands and the interlocking of fibers with the serrations, the large area of the slanted serration sides and to some degree of groove bottoms provides further area for frictional contact. The flat top serration form with a great number of teeth does not have the broaching action present in past serrated or grooved nails, particularly those with buttress type serrations, where the rearward faces of the serrations—those faces that encounter interlocked wood material on withdrawal—are rather sharp shoulders with a relatively large mass of wood material lying against them.

A further advantage of this nail form is found in the fact that it is adapted for practical, economical, modern large scale production from standard wire stock by a novel manufacturing method involving only modification of certain standard nail making machines and also to application of materials with such diverse properties as ordinary steel, stainless steel, copper, brass or monel wire.

A particularly noteworthy characteristic of the square shanked nail of this invention is the saving in material rendered possible for like holding power as compared to round wire nails and as well as many nails of special shank form. With respect both to required raw metal and to finished nails, pound for pound greater holding power is available in these nails than those of prior forms comparable in operational fabrication costs and driving and clinching strength characteristics. This of course is a matter of no little consequence even for steel nails in times of material shortage, as in the recent times of war; with respect to other special metals particularly such as copper or brass this advantage is of far greater importance.

An object of this invention is then the provision of a simple nail structure of excellent holding power adapted to low cost production. Another object is the provision of a nail structure wherein good holding power is attained along with improved driving characteristics, such as a minimized tendency to run out of or split wood as contrasted with ordinary wire nails, and which is susceptible of production by certain standard nail machines with minor mechanical modifications. Another object is the provision of a nail requiring less material for attainment of a given holding power than common round wire nails or square nails. Another object is the provision of a barbed or serrated nail adapted in form to production from the usual round wire stock. A still further object is the provision of a barbed or serrated shank nail, with or without head, of good holding power wherein the tendency toward bending during driving or breakage during driving or clinching is minimized.

Other objects and advantages of this invention will appear from the following description and the drawings wherein—

Fig. 1 is a vertical elevation of the nail of this invention viewed at right angles to a shank side;

Fig. 2 is similar to Fig. 1, with the nail rotated forty-five degrees to present a full view of one of the longitudinal shank edges;

Fig. 3 is a sectional view taken along a groove as indicated by the line 3—3 in Fig. 1;

Fig. 4 is a cross sectional view taken as indicated by the line 4—4 in Fig. 1;

Fig. 5 is an enlarged fragmentary sectional view of the serrations with the section running across the width of the grooves and lands as indicated by line 5—5 in Fig. 1;

Fig. 6 is a fragmentary development of the periphery of the shank of the nail of this invention showing the relative pattern of lands on successive sides or faces of the nail shank;

Fig. 7 is similar to Fig. 6 showing an alternate pattern; and

Fig. 8 is a portion of a nail shank, viewed as in Fig. 1, which includes a modified form of serrations.

In Fig. 1 of the drawings there is shown a wire nail having the flat head 10 and square pyramidal point 11 usual in the common flat headed wire nail. However the shank 12, in accordance with the present invention, has an approximately rectangular cross section here shown in preferred square form; and in each of the shank sides 13a–d to provide a serrated surface, a series of equispaced parallel grooves 14 is indented, each groove running across the major part of the width of the shank side, forming a correlative series of lands 15. In the preferred species of the invention the lands and grooves are directed obliquely, and in the modification of Fig. 8 at right angles, to the length of the shank side. The series of grooves and lands extend preferably from the base of the pyramidal point up to the head, although the lands just beneath the head may be somewhat distorted by the side-acting gripping jaws of the heading dies in the ordinary nail making machine contemplated as the means for manufacturing the nail.

As may best be seen from the enlarged sectional views Figs. 3 and 4, wherein the substantially straight sides of the shank section are joined by curved corners, the sides 13a—d of the shank—apart from the grooves 14—are substantially flat, with adjacent sides joined by transversely convexly curved longitudinal portions. The depth of the grooves 14 relative to the curved extent of the convex longitudinal portions is such that the ends of the grooves 14, hence of the lands 15, of adjacent sides intersect the intervening curved longitudinal portion along the marginal areas thereof. Thus there is left a continuous longitudinal convex land 18 at each longitudinal edge of the square nail, extending from beneath the head to a corresponding slant edge of the pyramidal point. With this relation of elements, the intersection line of the plane of a slant face of the point and of a corresponding shank side is of course at right angles to the length of the side.

Alternatively, as far as geometric description is concerned the basic structure may be considered to be a shank of approximately square cross section, with planes running through the bottom-most parts 14a of the grooves constituting sides of the shank which are joined by the convex longitudinal lands 18, the curvature of the lands 18 being carried out laterally across the adjacent ends of the serrations 15, so that the ends of the latter are in effect rounded into the longitudinal lands.

The enlarged fragmentary sectional view of Fig. 5 taken across the grooves and lands 14—15, shows the preferred groove and land shape for use whether the lands extend obliquely or straight across the shank. The top or outer faces of the lands 15 and also the groove bottoms 14a are substantially flat across their widths, while the sides 14b of the lands, i. e. the grooved walls, are inclined as in a dihedral angle of from about forty-five to about sixty degrees. The edge 14c serves during driving as a severing edge to cut fibers already deflected in the direction of penetration, which thereafter are disposed endwise toward those land sides approaching on nail withdrawal.

The patterns shown by the fragmentary peripheral shank developments of Figs. 6 and 7 are preferred particulary to adapt the nail structure to manufacture in an ordinary nail machine with roll slide modifications. With the pattern of Fig. 6, serrations on opposed shank sides 13a—c, 13b—d, run in parallel directions in the actual shank, which is also the case in the form of Fig. 8. With the pattern of Fig. 7, the serrations on opposed sides of the actual shank run in directions skew to each other.

The disposition of the pyramidal point edges shown in the drawing is preferred, since the portions of the fibers which lie in the paths of and come into contact with the serrated shank sides are less disturbed during penetration than would be the case were such edges brought up into the ends of the sides.

The nail form shown in Fig. 8, that is, having all serrations running perpendicular to the shank length, retains many of the advantages of the preferred form of Fig. 1, such as minimized splitting or run-out tendency and good holding power in a nail adapted to simple and low cost manufacture. Some degree of strength with respect to clinching and driving may be sacrificed, although the longitudinal lands and shallowness of grooves help to retain in some degree the strength of the preferred form as compared with many prior serrated nails.

With respect to other details of the disclosed nail, it may be first noted that excellent holding power in quite diverse wood materials has been attained over a large range of nail sizes where there was used a thirty-two pitch spacing of serrations along the shank with the groove depth on the order of only one-one hundredth of an inch— as may be obtained by using forming rolls of say sixty degrees standard straight knurl tooth shape and corresponding pitch, with the roll teeth thereof ground off slightly to flat top form. With that same size and form of serrations the grooves were directed obliquely to the shank length at an angle of about sixty degrees. It has been found further that a nail of the form just detailed is adapted to ready manufacture in the manner outlined from round wire of such varied properties as nail steel, copper, stainless steel and Monel metal. Such nails had the improved characteristics previously discussed respecting driving and clinching strength, strength under vibration, improved holding power, decreased tendency toward splitting and run-out and economy of material for desired holding power on a given job.

In such nails a great part of the area of the shank side is open to receive fibers and the cross land flats are wide enough for fiber cut-off, without difficulty with respect to wood splitting. The land flats adjacent the sloping groove sides cut off fibers without a broaching effect. However were the groove wall slope to be much beyond the sixty degrees stated, the tendency toward broaching on penetration or pull-out would become objectionable; and if below say about forty-five degrees, then suitable cutting would not be achieved. Also with the slope of the groove walls less than forty-five degrees a decrease in holding power may become objectionable since the fibers do not wedge as effectively against the surfaces in the groove formations; and moreover the length of the cut fibers deflected in the direction of penetration would be decreased. Were the groove bottoms not flat, but rather V-shaped for example, in obtaining the desired open area for fiber reception, undesirable penetration of the shank section would result with consequent great weakening of the nail in bending and concomitant increased tendency to bend in driving.

I claim:

1. A wire nail including a straight shank, in cross section generally rectangular with convexly curved corners providing straight similar convex longitudinal edges throughout the shank length; the length of each side of the rectangular shank having indented thereacross a series of parallel blunt-bottomed grooves; each groove having outwardly divergent walls and its bottom extending flat in a direction lengthwise of the groove; the walls of each groove being oblique to, and terminating endwise in longitudinal edges bounding, the shank side wherein the groove is indented; the grooves of each series being closely spaced to form a corresponding series of substantially flat top cross lands across each shank side with each land continuous with the surfaces of longitudinal edges, the depth of the grooves being such relative to the curvature of the convex edges that the respective series of intersections of the groove bottoms with the convex edge between adjacent sides are separated by a longitudinal portion of such edge as a continuous longitudinal land for guiding the nail in driving; and the top width of the cross lands being narrower than the top width of the grooves to form wood fiber-receiving openings over the major part of each side of the shank.

2. A nail including a straight shank, in cross section generally rectangular with convexly curved corners providing straight similar convex longitudinal edges throughout the shank length; the length of each side of the rectangular shank having indented thereacross a series of parallel blunt-bottomed grooves; each groove having outwardly divergent walls; the walls of each groove being oblique to, and terminating endwise in longitudinal edges bounding, the shank side wherein the groove is indented; the grooves of each series being closely spaced to form a corresponding series of substantially flat top cross lands across each shank side with each land continuous with the surfaces of longitudinal edges, the depth of the grooves being such relative to the curvature of the convex edges that the respective series of intersections of the groove bottoms with the convex edge between adjacent sides are separated by a longitudinal portion of such edge as a continuous longitudinal land for guiding the nail in driving; and the top width of the cross lands being narrower than the top width of the grooves to form wood fiber-receiving openings over the major part of each side of the shank.

3. A nail as described in claim 2, having a pyramidal penetrating point with the wood piercing slant edges thereof each respectively running into said longitudinal edge lands.

4. A nail as described in claim 2 wherein the said grooves are directed obliquely to the length of the shank, the relation between groove directions of one opposed pair of shank sides being similar to the relation between the other opposed pair.

5. A nail as described in claim 2 wherein the pitch between lands is from about twenty to forty per inch of shank length.

References Cited in the file of this patent

UNITED STATES PATENTS

| | | |
|---|---|---|
| 353,427 | Philips | Nov. 30, 1886 |
| 581,074 | King | Apr. 20, 1897 |
| 1,301,173 | Russel | Oct. 3, 1922 |
| 1,373,875 | Fallon | Apr. 5, 1921 |
| 1,932,358 | Thomson | Oct. 24, 1933 |
| 2,519,035 | Esty | Aug. 15, 1950 |
| 2,759,389 | Corckran | Aug. 21, 1956 |